United States Patent [19]

Carasso et al.

[11] 4,238,843

[45] Dec. 9, 1980

[54] DISC-SHAPED OPTICALLY READABLE RECORD CARRIER USED AS A DATA STORAGE MEDIUM

[75] Inventors: Marino G. Carasso; Johannes J. Verboom; Maarten R. de Haan, all of Eindhoven, Netherlands

[73] Assignee: U.S. Philips Corporation, New York, N.Y.

[21] Appl. No.: 8,221

[22] Filed: Jan. 31, 1979

[30] Foreign Application Priority Data

Nov. 6, 1978 [NL] Netherlands .................. 7811003

[51] Int. Cl.³ .................. G11C 13/04; G11B 7/00
[52] U.S. Cl. .................. 365/234; 179/100.3 V; 358/128.5
[58] Field of Search .................. 365/215, 234; 179/100.3 V; 358/128

[56] References Cited

U.S. PATENT DOCUMENTS

| | | | |
|---|---|---|---|
| 3,371,154 | 2/1968 | Frohbach et al. | 358/128 |
| 3,812,477 | 5/1974 | Wieder | 365/234 |
| 4,138,741 | 2/1979 | Hedlund et al. | 365/234 |

OTHER PUBLICATIONS

Mathiew, A Random Access System Adapted for the Optical Videodisc; Its Impact on Information Retrieval, SMPTE Journal, 2/77, vol. 86, pp. 80-83.

*Primary Examiner*—Stuart N. Hecker
*Attorney, Agent, or Firm*—Thomas A. Briody; William J. Streeter; Simon L. Cohen

[57] ABSTRACT

A disc-shaped record carrier having an information track which is divided into a plurality of sectors per track circumference. Each sector is divided into a data section, in which the data can be recorded, and a synchronizing section. This synchronizing section consists of an optically detectable relief structure and comprises an indicator portion and an address portion. The address portion contains the information about the track number and the sector number. The indicator portion serves to define the beginning of the address portion unambiguously and for this purpose has such a relief structure that the indicator signal produced after cooperation with the radiation beam has a frequency which is clearly distinguishable from signal components resulting from the address portion.

7 Claims, 9 Drawing Figures

8a

8b

8c

DISC-SHAPED OPTICALLY READABLE RECORD CARRIER USED AS A DATA STORAGE MEDIUM

The invention relates to a disc-shaped record carrier, provided with substantially concentric information tracks, which per track circumference are divided into a number of sectors, each sector being divided into a data section, in which optically detectable information can be recorded with the aid of a radiation beam, and a synchronizing section, for defining the sector boundaries.

At present optically readable record carriers are in the focus of interest, which interest until now was mainly directed to the use of such record carriers as a storage medium for video and/or audio programs.

Because of the high storage capacity such record carriers are also particularly suitable as a data storage medium, said data being recorded in the record carrier in digitized form. In order to enable the requirements imposed by data storage to be met the record carrier should differ substantially in respect of the organization in the information track from the organization used for recording video and/or audio information. For the last-mentioned types of information the entire program to be recorded is applied as one flow of information and thus recorded in the information track. However, in the case of data storage it should be possible to record the individual data units at desired arbitrary locations in the information track.

A record carrier of the type mentioned in the preamble and an apparatus for writing and reading data on this record carrier is for example known from U.S. Pat. No. 3,891,794. This patent describes a system in which a multitude of binary-coded words are recorded in each track circumference of the information track. Thus, each word occupies only a small portion of a track circumference. Consecutive words are separated by unambiguously detectable optical synchronization marks, which serve to enable the recorded data to be detected and decoded word by word during reading. By varying the shape of said optical synchronization mark a certain distinction between the recorded words can still be obtained.

The system described in said U.S. patent has a number of drawbacks, which render it less suitable for data storage in conformity with current requirements. For example, in accordance with this known system the synchronization marks are recorded in the information track simultaneously with the data. This means that the accuracy of the division into sectors of the information track is completely determined by the write apparatus employed by the user. As stringent requirements are imposed on this division into sectors, this means that the write apparatus employed by the user should also comply with stringent requirements. Furthermore, each information word should be readable individually, for which it is necessary that each information word is individually identifiable. The optical synchronization marks used in the known system are definitely not suitable for this purpose.

It is an object of the invention to provide a record carrier of the type mentioned in the preamble, which in a particularly effective manner is suitable for data storage. To this end the invention is characterized in that the synchronizing section comprises an optically detectable relief structure with, in this order, an indicator portion and an address portion, the address of the relevant sector being stored in digitally coded form in the address portion and the indicator portion having such a relief structure that cooperation with a read beam results in an indicator signal which is situated in a frequency range which at the most contains only very weak frequency components of the digital signal resulting from cooperation of the read beam with the address portion.

Since in accordance with the invention the synchronizing section consists of a relief structure, it is first of all ensured that the record carriers intended for the user can be manufactured simply and cheaply. As is known such disc-shaped record carriers with a relief structure can be manufactured in large quantities with the aid of a so-called mother disc, matrices derived therefrom and the pressing techniques known for audio discs.

Furthermore, the synchronizing section contains an address portion in which address information is stored in digitally coded form. This means that each sector is provided with individual address information, so that each sector, i.e. also each associated data section, can be selected individually, both during data writing and reading. It is obvious that this is essential for the possibilities of use and for an efficient use of the record carrier.

In order to ensure that the address information stored in the address portion is detected unambiguously, the synchronizing section, in accordance with the invention, is furthermore provided with an indicator portion which precedes the address portion. The function of this indicator portion is to define the beginning of a synchronizing section in an unambiguously detectable manner, which is of great importance for a correct detection of the address information. It has been found that a particularly simple and reliable detection of this indicator portion is possible if this indicator portion has such a relief structure that after cooperation of a read beam with said structure the resulting signal component in respect of its spectral position differs from the signal components resulting from the address portion. This enables said signal component to be detected with the aid of a narrow-band band-pass filter, which provides a particularly reliable detection. Effective use is then made of the fact that for recording the address information on the record carrier digital modulation techniques are employed, which inter alia serve to limit the frequency spectrum of the recorded signal.

One of the principal requirements imposed in this respect is that the recorded address signal has a frequency spectrum which does not coincide with the frequency spectrum of the servo signals which inter alia control the radial position of the radiation beam and the focussing of said radiation beam on the record carrier. As these servo signals are signals of comparatively low frequency a digital modulation system is preferred which yields a frequency spectrum which contains no or hardly any low frequency components. A first preferred embodiment of the record carrier in accordance with the invention makes effective use of this fact in that the indicator portion comprises one single low-high structure having a length which is great relative to the period length of the relief structure in the address portion.

A further preferred embodiment of the record carrier in accordance with the invention is characterized in that the indicator portion comprises a plurality of consecutive low-high structures of such a length such that the resulting indicator signal has a frequency equal to the bit frequency of the address signal, and that for recording the address signal a modulation is selected whose frequency spectrum is substantially zero at this bit. This preferred embodiment utilizes the recognition that it is possible to employ modulation techniques which have the property that the resulting signal has a frequency spectrum which is zero at the bit frequency. By selecting the structure of the indicator portion so that the resulting indicator signal has this very bit frequency, an unambiguous detection of the indicator signal, which is distinguishable from the address signal, is obtained. As moreover this bit frequency has a comparatively high frequency, it is ensured that interaction between said indicator signal and the servo signals is avoided.

The invention will now be described in more detail with reference to the Figures, in which FIGS. 1 and 2 schematically represent a discshaped record carrier, FIG. 3 represents the division of a sector, and FIG. 4 represents a possible form of the synchronizing section in accordance with the invention, FIG. 5 shows the frequency spectrum of the binary signal obtained in accordance with three possible modulation techniques, and FIG. 6 shows the binary signals obtained by means of these modulation techniques.

Figure 1:
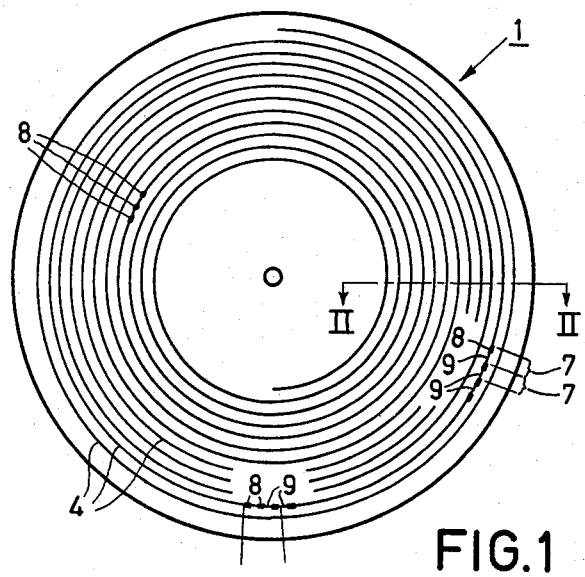

FIG. 1 is a plan view of an embodiment of the record carrier in accordance with the invention. The record carrier body 1 is provided with a spiral track 4. This track 4 is divided into a multitude of sectors 7, for example 128 per revolution. Each sector 7 comprises a data section 9, which is intended for recording data, and a synchronizing section 8.

Figure 2:
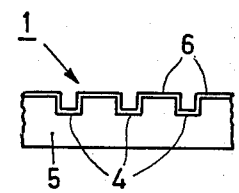

In order to ensure that the data information is recorded in an accurately defined path the track 4 is employed as servo track. For this purpose the data sections 9 of the sectors 7 have the amplitude structure, as is shown in FIG. 2. This FIG. 2 shows a small part of the cross-section taken on the line II—II in FIG. 1 and thus shows a number of adjacent track portions, specifically data sections, of the servo track 4. Thus, the direction of the servo tracks 4 is perpendicular to the plane of drawing. These servo tracks 4, in particular the data sections 9, are formed in the substrate 5 as grooves. In this way it is possible to ensure that a radiation beam which is directed at the record carrier for the recording of data accurately coincides with said servo track 4, i.e. to control the position of the radiation beam in a radial direction via a servo system which employs the light reflected by the record carrier. The radial position of the radiation spot on the record carrier is measured in a similar way as in the systems which are also employed for optical record carriers provided with a video signal and which are inter alia described in "I.E.E.E. Transactions on consumer electronics," November 1976, page 307.

For the recording of data the record carrier body is provided with a layer of a material 6 which, if exposed to suitable radiation, is subject to an optically detectable change. In principle only the data sections 9 of the sectors would have to be provided with such a layer. However, for reasons of manufacturing technology it is simpler to provide the entire record carrier surface with such a layer. This layer 6 may for example consist of a thin metallic layer, such as tellurium. By means of laser radiation of sufficiently high intensity said metallic layer can be melted locally, so that locally this information layer 6 is given another reflection coefficient, as a result of which during scanning of a recorded information track by a read beam the reflected radiation beam is amplitude-modulated in accordance with the recorded information.

The layer 6 may also take the form of a double layer of materials which chemically react to incident radiation, for example aluminium on iron. At the location where a high-energy radiation beam is incident on the disc $FeAl_6$ is formed, which is a poor reflector. The same effect is obtained in the case of a double layer of bismuth on tellurium, $Bi_2Te_3$ being formed. It is alternatively possible that the layer 6 consists of an anti-reflection layer. The laser radiation can then form locally reflecting areas.

As with the aid of the servo track, which takes the form of a groove in the substrate 5, the write spot of radiation accurately coincides with said servo track, in particular when a data section is scanned, the data modulating the write beam are accurately recorded in the data section which coincides with said servo track.

Figure 3:
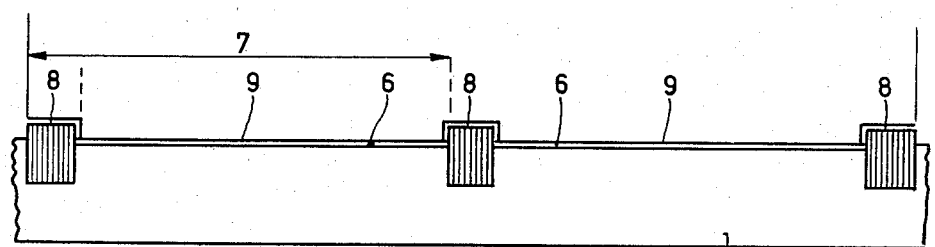

As is evident from the foregoing the record carriers intended for the user, i.e. record carriers which do not yet contain data in the data sections, have a groove structure in these data sections within the sectors. Moreover, each sector in such a record carrier comprises a synchronizing section 8, which takes the form of an optically detectable relief structure. FIG. 3 on an enlarged scale shows a part of a track 4, which illustrates the sequence of a number of data sections 9 and synchronizing sections 8. The synchronizing sections 8 comprise a relief structure, consisting of a sequence of recesses alternating with intermediate areas. The depth of the recesses in this structure of the synchronizing section is greater than the depth of the servo track in the data section 9. This depth of the recesses is selected in such a way in accordance with general optical rules and depending on the shape of said recesses and the selected read system that an optimum read-out of the information represented by the structure is obtained. If a read system is adopted in which the radiation beam reflected by the record carrier is detected by a single photodetector, $\frac{1}{4} \lambda$ may be chosen as the depth for the recesses, $\lambda$ being the wavelength of the radiation beam used. For the depth of the servo track in the data section 9 the value $\frac{1}{8} \lambda$ or less is then selected, so that said servo track has hardly any effect on the amount of light detected by the detector.

Figure 4:
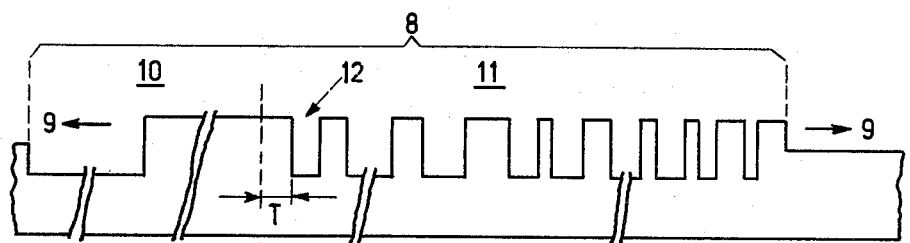

For a more detailed illustration of the synchronizing section FIG. 4 once again shows such a synchronizing section on an enlarged scale, the information layer 6 being omitted for the sake of simplicity. Such a synchronizing section 8 comprises two portions, namely an indicator portion 10 and an address portion 11. All the information required for controlling the write process is stored in the address portion 11. When data are recorded these data are converted into a so-called word-organized bit series. In one embodiment of the record carrier in accordance with the invention the data section is for example adapted for recording 174 words of 8 bits each. For a most effective use of the available information capacity on the record carrier, i.e. the length of the data sections, it is of great importance that the frequency of the bit series applied for storage is accurately defined. In order to achieve this the address portion 11 of the synchronizing section 8 contains a plurality (for example 14) words 12 with a symmetrical pattern, from which the desired bit frequency can be derived. By means of this the bit frequency with which the data are applied is then adjusted to the desired value. Moreover, said address portion contains information about the word organization, which during recording defines the location of the bit words and ensures a suitable decoding of the bit words during reading.

Furthermore, this address portion 11 contains information about the track number of the track circumference in which the corresponding sector 8 is situated and the number of this sector in said track circumference. This information is recorded as a relief structure in accordance with a digital modulation technique suitable for the recording medium. Thus, as the record carrier, in addition to the servo track which takes the form of a groove in the data sections 9, in the synchronizing section also contains all the information required for positioning the data as a bit-word organized bit series in said data sections, the requirements imposed on the write and read apparatus employed by the user need be less stringent. Since furthermore this pre-recorded information is recorded in the record carrier as a relief structure, this record carrier is particularly suitable for mass manufacture, for which the usual pressing techniques may be employed.

For an unambiguous and optimum detection of the information stored in the address portion 11 it is of particularly great importance that the beginning of said address portion is defined unambiguously. For this purpose, in accordance with the invention, the synchronizing section 8 comprises an indicator portion 10 which precedes the address portion 11. This indicator portion 10 has such a relief structure such that when this structure is scanned by a radiation beam a signal is obtained which is clearly distinguishable from all other signal components resulting from the address portion or from data recorded in the data sections. For this purpose the indicator portion 10 shown in FIG. 4 comprises one single symmetrical low-high structure having a length which is substantially greater than the maximum length of a low-high structure in the address portion 11. This means that the signal resulting from said indicator portion 10 has a frequency which is low relative to the frequency components of the information stored in the address portion 11. It is obvious that in this respect the modulation used for recording the address information plays an essential part. For the relative position of the various frequency components reference is made to FIG. 5 which shows frequency spectra of three possible modulations and to FIG. 6 which by way of illustration shows the corresponding binary signals.

Figure 5:
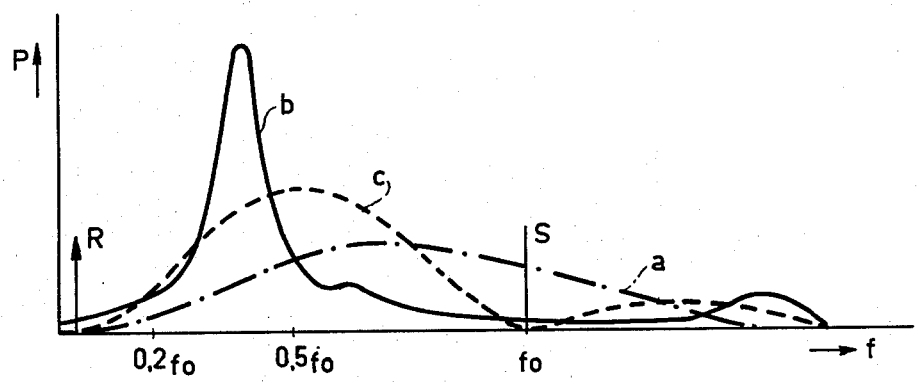
Figure 6:
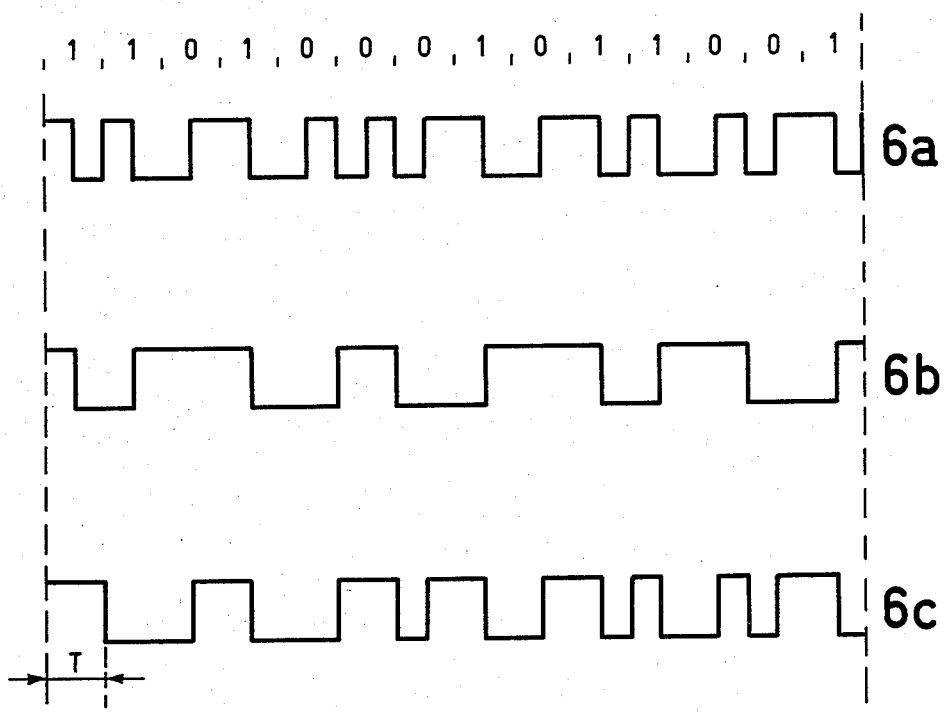

The reference a in FIG. 6 denotes a modulation known as "biphase" modulation. The applied digital signal is then converted into a binary signal which for a logic "one" of the applied digital signal is positive during the interval T/2 and negative during the next interval T/2, T being the bit time of the applied digital signal. Conversely, a logic "zero" produces the opposite binary signal, i.e. negative during the interval T/2 and positive during the next interval T/2. This modulation technique yields a binary signal having an energy-distribution frequency spectrum as is represented by a in FIG. 5. The frequency of then corresponds to 1/T.

The reference b in FIG. 6 refers to a modulation known as "Miller" modulation. The binary signal obtained with this modulation has a transition halfway between a logic "one" of the applied digital signal and at the transition of two consecutive logic "zeros." The frequency spectrum of the binary signal obtained with the aid of this modulation technique is designated b in FIG. 5.

Finally, the reference c refers to a modulation for which the applied bit series of the digital signal is first of all divided into consecutive groups of two bits. From each two-bit group with a duration 2T a binary signal is derived which in a first time interval T has the same variation as the original two bits and in the next time interval T has an inverse variation. The binary signal obtained by this modulation technique has a frequency spectrum as is represented by c in FIG. 5.

From FIG. 5 it is evident that these modulation techniques have the common property that the binary signal obtained has no strong frequency components at relatively low frequencies, for example frequencies lower than 0.2 fo. This datum is particularly useful in connection with an optical record carrier and the write and read systems employed in conjunction therewith. As previously stated, such systems employ both a servo control for keeping the scanning spot accurately focussed on the record carrier and a servo control which controls the radial position of the scanning spot and causes the said scanning spot to coincide exactly with the information track. As the control signals required for the servo controls are derived from the radiation beam which is reflected by the record carrier, which is also modulated by the relief structure of the synchronizing section, it is essential that the frequency spectrum of the binary signal stored in the address portion contains no strong frequency components within the frequency band of the control signals. As these control signals occupy only a band of comparatively low frequency this requirement is adequately met by the choice of one of the said modulation techniques. The control signals for the said servo systems for example extend up to a maximum frequency value of 15 kHz. If for example the value of 500 kHz is selected for the frequency fo=1/T, it will be apparent from FIG. 5 that the binary signals a, b or c at the frequency of 15 kHz and lower have only very weak frequency components.

The invention makes effective use of this fact by ensuring that the indicator portion 10 of the synchronizing section 8 has such a relief structure that the resulting signal has a comparatively low frequency. If the low-high structure shown in FIG. 4 has a period time of 16T, the resulting signal component will have a frequency fo/16. For a choice of fo=500 kHz this results in a signal component R, shown in FIG. 5, having a frequency of approximately 31 kHz. It will be evident that this signal component can be distinguished both from the binary signal a, b or c and from the servo signals in a particularly unambiguous and easy manner with the aid of a filter. This means that in this way a particularly unambiguous and reliable indication for the beginning of the synchronizing section 8 is obtained, so that the decoding of the information stored in the address portion 11 can be realized in a reliable manner.

Figure 7:
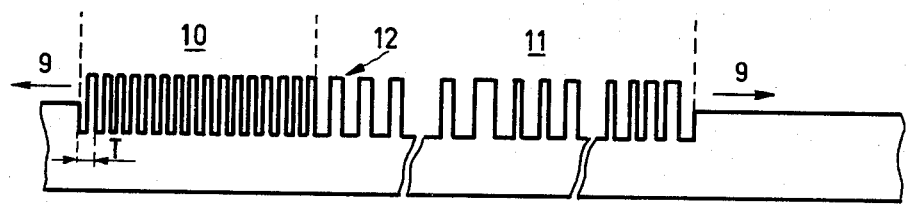
FIG. 7 shows a second form of the synchronizing section in accordance with the invention.

FIG. 7 shows a second version of the synchronizing section 8, in particular the indicator portion 10. In the embodiment shown in this Figure the indicator portion 10 has a symmetrical low-high structure with a period T. This means that the signal component resulting from this pattern has a frequency $f = 1/T = fo$. From FIG. 5 it appears that for the modulation systems b and c the signal content at the frequency fo is very small, even zero for the modulation system c, if the binary signal in the address portion also has a period T. This means that when one of these modulation systems b or c is used the signal component S resulting from the indicator portion 10 can be detected very simply with the aid of a narrow-band pass filter for this frequency fo. As this signal component S moreover has a large frequency spacing to the servo signals, the likelihood of an undesired interaction between these components is very small.

As stated previously, the indicator portion 10 has the function of initiating the detection of the address information in the address portion 11 both during data recording and data reading. This detection of the address information is effected in the usual manner, bit synchronization being effected first with the aid of the synchronizing bits 12, after which word synchronization and finally detection of the stored address information is effected. The resulting bit and word synchronization is also employed for synchronizing the applied data when recording these data in the data sections 9, so that the available storage capacity is used in an optimum manner.

In order to retain the advantage of the selected structure of the indicator portion 10 after data have been recorded in the data sections, it is obviously desirable that for recording these data a modulation technique is used which yields a binary signal which has no significant signal content at the frequency of the indicator signal produced by the indicator portion 10. In this respect it is obvious to use the same modulation technique for the data as for the address information.

The binary signal obtained with such a modulation technique may obviously be used directly for modulating a laser beam. By means of this laser beam the metal layer in the data track is then locally melted, so that the data are recorded therein. The length of the melted areas will consequently vary and represent the binary "one" or the binary "zero" of the binary signal. However, it has been found that during recording it is more favorable to switch the laser only briefly to a level which is sufficiently high for melting the metal layer. In this respect the described modulation techniques yield an additional advantage. For example, when considering the modulation technique c, it is found that in the resulting binary signal the duration of each of the possible binary states can assume only a very limited number of discrete values, namely $T/2$, $T$, $3/2T$, $2T$.

Figure 8:
FIG. 8 illustrates a possible method of recording the information on the record carrier, using one of the modulation techniques in accordance with FIGS. 5 and 6, while FIG. 9 finally schematically shows the electronic circuits for detecting the indicator signal.
Figure 8:
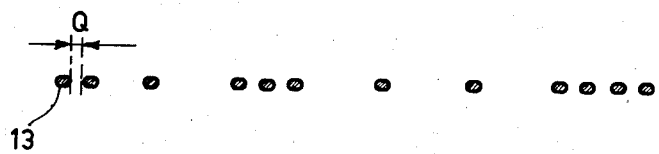
Figure 8:
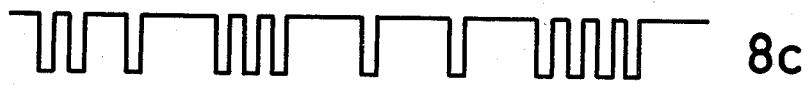

This enables said binary signal to be recorded in a manner as is schematically represented in FIG. 8, FIG. 8a representing a part of the binary signal. This binary signal is recorded on the record carrier in accordance with a pattern of melting spots 13 (FIG. 8b) of constant dimensions. For this purpose the logic level of the binary signal may for example be detected each time halfway between one bit length T and the laser may briefly be switched to a high write intensity if said logic level is a "one." It can then be seen from FIG. 8b that the number of melted spots within a group which is situated at a mutually constant distance from the bit length T/2 represents the discrete length of the binary "one." It has been found that in this way a very reliable write process is obtained. If during reading of such a pattern of melting spots a read spot is used having a diameter which is greater than the distance $a$ between the edges of two consecutive melting spots within a group, but smaller than the distance corresponding to the bit length T, the signal obtained by means of the read beam again virtually corresponds to the original binary signal. In a similar way as melting spots of constant length can be obtained during recording of the data in the data section, it is also possible to realize recesses with a constant length address information in the address portion 11, as is shown in FIG. 8c. The invention is by no means limited to the organization of the record carrier shown by way of example, such as the degree of subdivision into sectors, the realization of the data sections as servo track for the radial tracking etc. For alternative forms of this servo track and the associated generation of a control signal for the radial servo tracking, reference is made to the applicant's previous U.S. patent application Ser. No. 925,229, filed July 17, 1978. This previous patent application also comprehensively discusses the optical systems employed when using a disc-shaped record carrier of the type mentioned in the present application. As the specific construction of the optical systems is not essential for the present invention, it suffices to refer to the said previous patent application.

Figure 9:
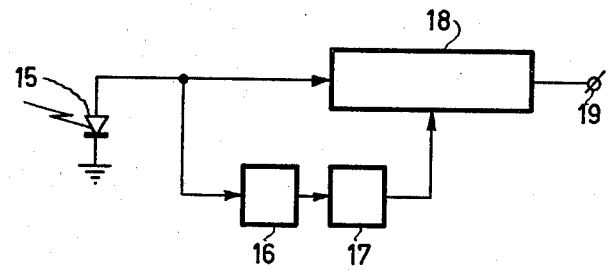

In order to illustrate the function of the detected indicator signal in the write and/or read apparatus, FIG. 9 finally schematically shows the electronic circuits which are of interest in this respect. The read detector by means of which the information content of the radiation beam reflected by the record carrier is detected is designated 15. The indicator signal is extracted from the signal thus obtained with the aid of a filter 16. If an indicator signal 5 is used at the frequency fo (FIG. 5) this filter will at any rate be a narrow-band band-pass filter, while if an indicator signal R is used, this may be a band-pass or a low-pass filter. The output of this filter 16 is connected to a threshold detector 17, which produces an output signal as soon as the signal on its input exceeds a specific threshold value. This threshold detector 17 suppresses the influence of any disturbing signal components in the proximity of the indicator signal. The output of this threshold detector 17 is connected to a control input of a decoder circuit 18, whose signal input is connected to the detector 15. This decoder circuit decodes the address information being read in the usual manner, with the proviso that this decoding is now initiated by the detected indicator signal, so that the address information is unambiguously distinguished from the data being read and moreover the decoding of this address information as the word synchronization is realized in an effective manner. The signal produced by this decoding circuit 18 is then available on an output terminal 19.

What is claimed is:

1. An improved disc-shaped record carrier, provided with substantially concentric information tracks, which per track circumference are divided into a number of sectors, each sector being divided into a data section, in which optically detectable information can be recorded with the aid of a radiation beam, and a synchronizing section for defining the sector boundaries, the improvement being characterized in that the synchronizing section comprises an optically detectable relief structure with, in this order, an indicator portion and an address portion, the address of the relevant sector being stored in digitally coded form in the address portion and the indicator portion having such a relief structure that cooperation with a read beam moving relatively with respect to said record carrier results in an indicator signal which is situated in a frequency range which at the most contains only very weak frequency components of the digital signal resulting from cooperation of the read beam with the address portion.

2. A disc-shaped record carrier as claimed in claim 1, characterized in that the indicator portion comprises one single low-high structure having a length which is great relative to the period length of the relief structure in the address portion.

3. A disc-shaped record carrier as claimed in claim 1, characterized in that the indicator portion comprises a plurality of consecutive low-high structures of such a length that the resulting indicator signal has a frequency equal to the bit frequency of the address signal, and that for recording the address signal a modulation is selected whose frequency spectrum is substantially zero at said bit frequency.

4. A disc-shaped record carrier as claimed in any one of the preceding claims, characterized in that the address portion of the synchronizing section has a relief structure, which consists of consecutive recesses and intermediate areas, the recesses having a constant length in the track direction and the structure comprising a plurality of information blocks, said information blocks representing one of the two binary values of the address signal and the number of recesses within an information block representing the duration during which this binary value is assumed.

5. A disc-shaped record carrier as claimed in claim 4, characterized in that the data are recorded in the data section in a structure consisting of a sequence of optically distinguishable areas and intermediate areas, the areas having a constant length in the track direction and said structure comprising a plurality of information blocks, which information blocks represent one of the two binary values of the data, while the number of areas within one information block represent the duration during which said binary value is assumed.

6. An apparatus for writing and/or reading data employing a record carrier as claimed in claim 4, characterized in that the apparatus is provided with a decoding device for decoding the address information being read, a detection circuit for extracting the indicator signal read and, during reading of said indicator signal, applying a detection signal to the decoding device for initiating the address decoding.

7. An apparatus as claimed in claim 6, characterized in that the detection circuit is provided with a filter for extracting the indicator signal and a threshold detector for supplying the detection signal.

* * * * *